No. 676,832. Patented June 18, 1901.
C. D. ZEIGLER.
PROCESS OF MAKING EDGED TOOLS.
(Application filed Mar. 20, 1900.)
(No Model.)
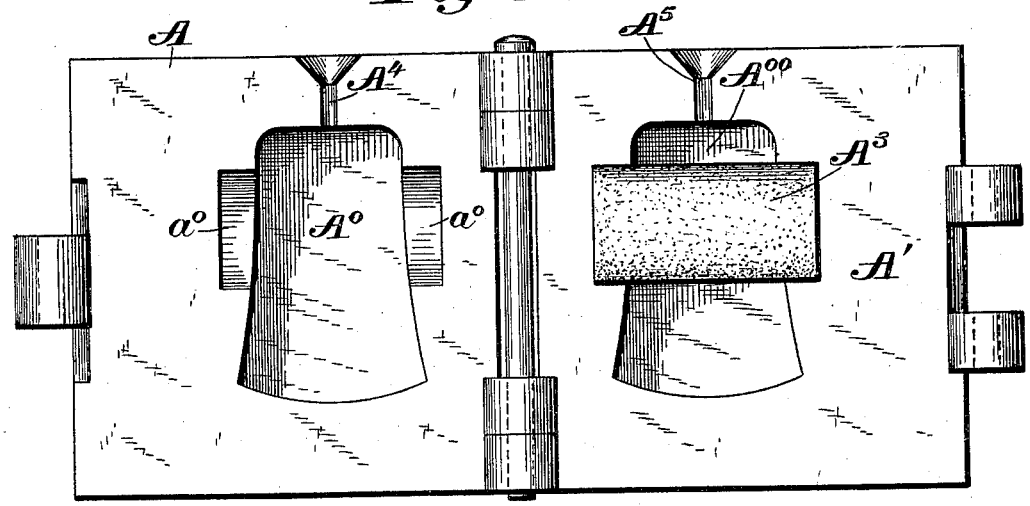
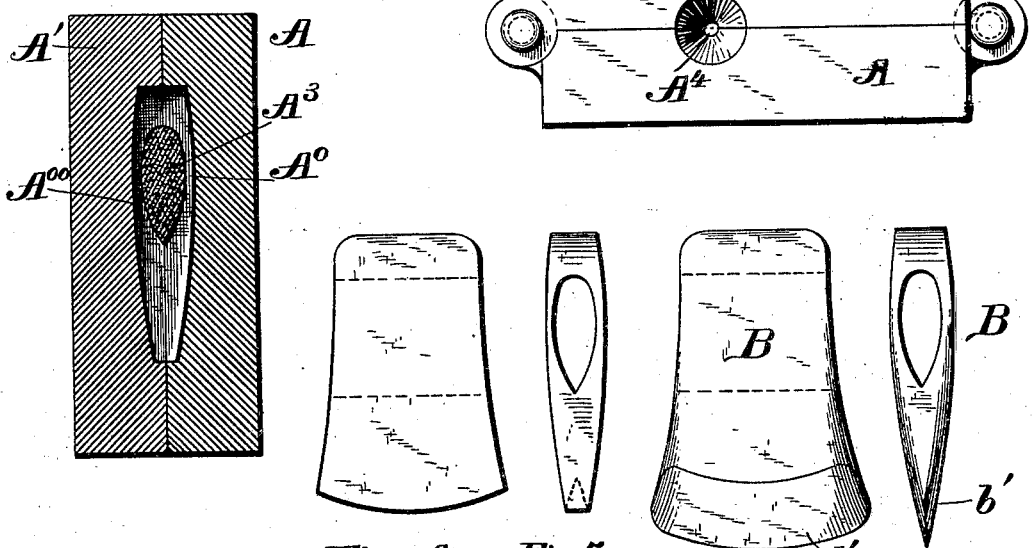
Witnesses
Percy C. Bower
John ...
Inventor
Charles D. Zeigler,
by ...
Attorneys

UNITED STATES PATENT OFFICE.

CHARLES D. ZEIGLER, OF LEWISTOWN, PENNSYLVANIA.

PROCESS OF MAKING EDGED TOOLS.

SPECIFICATION forming part of Letters Patent No. 676,832, dated June 18, 1901.

Application filed March 20, 1900. Serial No. 9,442. (No model.)

*To all whom it may concern:*

Be it known that I, CHARLES D. ZEIGLER, a citizen of the United States, residing at Lewistown, in the county of Mifflin and State of Pennsylvania, have invented certain new and useful Improvements in Processes of Making Edged Tools; and I do hereby declare the following to be a full, clear, and exact description of the invention, such as will enable others skilled in the art to which it appertains to make and use the same.

My invention relates to improvements in the process of producing edged tools, and particularly axes, hatchets, and similar edge-tools; and it has for its object the production of a tool having a head composed of a low-grade or cast steel head and cutting edge of high-grade edge-steel, the process relating particularly to the manner in which the high-grade-steel edge is united to the cast-steel head or blank.

According to my process the head or blank of the tool is first cast from an open-hearth furnace into a mold or chill. The mold or chill is preferably formed in two sections, and in the production of an ax-head a sand core is provided in the mold to form the eye of the tool. The head or blank of the tool is cast into any desired form, according to the shape of the mold used, and after being removed from the mold or chill a piece of high-grade steel is united with the cast blank to form the edge of the tool. This piece of high-grade steel, which is to constitute the edge of the finished tool, is united by welding after the blank is removed from the mold. The piece of steel which is to constitute the edge of the tool may be laid on the cast blank, or the latter may be so formed in the mold that the edge-steel may be inserted into a V-shaped cavity therefor in a cast blank.

In order that my invention may be more readily understood, reference is had to the accompanying drawings, in which are shown a mold or chill in which the blank may be cast, as well as a development of the tool.

In the accompanying drawings, Figure 1 represents a plan view of a cast-iron mold or steel, such as has been used by me in carrying out my process. Fig. 2 is a top plan view of the mold or chill closed. Fig. 3 is a vertical sectional view through the closed mold or chill. Fig. 4 is a side elevation of the cast blank as it comes from the mold. Fig. 5 is an edge view of the same. Fig. 6 is a side elevation of a finished ax produced according to my process, and Fig. 7 is an edge view of the same.

The mold or chill (shown in Fig. 1) consists of two sections A A', hinged together so as to be opened and closed upon each other, the said sections being provided with cavities $A^0$ $A^{00}$, which when the mold is closed form a cavity to receive the molten metal. These cavities are provided with lateral extensions $a^0$ for the reception of the ends of a core $A^3$, preferably of sand, to form the eye of the tool. The mold is filled through an opening formed one-half in each of the sections A' and A, as seen at $A^4$ and $A^5$ in Fig. 1.

In Figs. 4 and 5 are shown blanks as they come from the mold, that portion of the blank to which the edge is to be united being tapered, as shown, or made with a V-shaped recess, as indicated in dotted lines. Thus the piece of steel to form the edge of the tool may be laid on over the blank or may be inserted in this recess.

In Figs. 6 and 7, wherein are shown views of a finished ax B made in accordance with my process, the steel edge $b'$ is shown as laid on, but it may be inserted, as hereinbefore described.

The welding of the steel edge with the cast blank is effected in the ordinary manner of welding—that is to say, by the parts being heated to the welding heat and by hammering cause the molecules of the steel edge to unite firmly with the molecules of the cast blank. The tool is afterward finished in any convenient manner to the desired shape.

I am aware that it has been proposed to cast a tool-head upon a steel edge by placing the steel for the edge into the mold and afterward pouring molten metal (cast-iron) into the mold and allowing it to run around the steel edge, depending entirely upon the heat of the molten metal to unite the steel edge with the cast-iron head. This process is objectionable in that a perfect union between the steel edge and the cast head cannot be effected, and it is the object of my invention to produce a tool of this character the steel edge of which is successfully united with the cast head by welding.

Having thus described my invention, what I claim, and desire to secure by Letters Patent of the United States, is—

1. The herein-described process of forming edged tools which consists in casting a blank for the head of the tool from an open-hearth furnace into a suitable mold; removing the blank thus cast from the mold, then welding a piece of high-grade steel to the cast blank to form the edge of the tool, and finally finishing the tool, substantially as described.

2. The herein-described process of making edged tools which consists in forming a cast for the head of the tool of molten steel in a suitable mold and afterward welding a high-grade steel onto the blank for the edge of the tool, and afterward finishing the tool, substantially as described.

3. An edge-tool having a head or body portion consisting of a casting of ductile low-carbon metal and a steel cutting-bit secured to said casting by a hammer-weld, the surface joint between the two metals following the irregular line due to the flow of the metals in hammer-welding the same, substantially as specified.

4. The mode herein described of making an edge-tool, said mode consisting in casting the body of the tool of ductile low-carbon metal, forming an opening in said casting, inserting the tongue of a steel cutting-bit in said opening, both parts having been previously heated to a welding heat, and securing the two together by hammer-welding, substantially as specified.

In testimony whereof I affix my signature in presence of two witnesses.

CHARLES D. ZEIGLER.

Witnesses:
H. I. TAYLOR,
A. REED HAYES.